United States Patent
Bansal et al.

(10) Patent No.: US 12,401,626 B2
(45) Date of Patent: Aug. 26, 2025

(54) MULTI-FACTOR NETWORK SEGMENTATION

(71) Applicant: Salesforce, Inc., San Francisco, CA (US)

(72) Inventors: Kaushal Bansal, Pleasanton, CA (US); Fiaz Hossain, San Francisco, CA (US); Prabhat Singh, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 84 days.

(21) Appl. No.: 18/457,557

(22) Filed: Aug. 29, 2023

(65) Prior Publication Data

US 2025/0039155 A1    Jan. 30, 2025

Related U.S. Application Data

(60) Provisional application No. 63/516,454, filed on Jul. 28, 2023.

(51) Int. Cl.
*H04L 9/40*    (2022.01)

(52) U.S. Cl.
CPC ...... *H04L 63/0414* (2013.01); *H04L 63/0236* (2013.01); *H04L 63/0823* (2013.01); *H04L 63/20* (2013.01); *H04L 63/166* (2013.01)

(58) Field of Classification Search
CPC ............. H04L 63/0414; H04L 63/0236; H04L 63/0823; H04L 63/20; H04L 63/166
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

FOREIGN PATENT DOCUMENTS

| CN | 104506487 B | 12/2017 |
| EP | 3611619 A1 | 2/2020 |

(Continued)

OTHER PUBLICATIONS

"All Data Breaches in 2019 & 2020—An Alarming Timeline" SelfKey Blog, Jul. 5, 2020.

(Continued)

*Primary Examiner* — Cheng-Feng Huang
(74) *Attorney, Agent, or Firm* — Nicholson De Vos Webster & Elliott LLP

(57) ABSTRACT

Implementation(s) for multi-factor network segmentation are described. A plurality of packets at a higher layer of a network stack is processed, where at least one packet of the plurality of packets was previously determined, as part of processing the at least one packet at lower layers of the network stack, to be authorized to be processed by the higher layer. Specifically, responsive to successful authentication of a cryptographic certificate received during the handshake process, a second service is identified from the cryptographic certificate. It is determined, based on a security policy, that the second service is authorized to access the first service. Responsive to the determination, a configuration is caused such that packets sent using the source address are now authorized to be processed by the higher layer.

21 Claims, 8 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Stephan |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,554,793 B2 | 10/2013 | Unger et al. |
| 8,566,301 B2 | 10/2013 | Rueben et al. |
| 8,583,964 B2 | 11/2013 | Chen et al. |
| 8,646,103 B2 | 2/2014 | Jakobson et al. |
| 8,707,264 B2 | 4/2014 | Hossain et al. |
| 8,726,240 B2 | 5/2014 | Gallagher et al. |
| 8,752,017 B2 | 6/2014 | Hossain et al. |
| 8,839,209 B2 | 9/2014 | Gallagher et al. |
| 8,893,093 B2 | 11/2014 | Hossain et al. |
| 8,930,327 B2 | 1/2015 | Hossain et al. |
| 9,405,896 B2 * | 8/2016 | Simone .................. G06F 21/41 |
| 10,810,233 B2 | 10/2020 | Bansal et al. |
| 10,838,962 B2 | 11/2020 | Bansal et al. |
| 11,392,419 B2 | 7/2022 | Sridharan et al. |
| 11,552,802 B2 | 1/2023 | Bansal et al. |
| 11,651,291 B2 | 5/2023 | Karanth et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |

(56) References Cited

U.S. PATENT DOCUMENTS

| | | |
|---|---|---|
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2018/0241775 A1* | 8/2018 | Vera-Schockner .......... H04L 63/0428 |
| 2019/0312909 A1 | 10/2019 | Kulkarni et al. |
| 2020/0059420 A1* | 2/2020 | Abraham .............. G06F 9/5072 |
| 2020/0097481 A1 | 3/2020 | Cosentino et al. |
| 2021/0234890 A1 | 7/2021 | Bansal et al. |
| 2021/0241047 A1 | 8/2021 | Karanth et al. |
| 2021/0263663 A1 | 8/2021 | Bansal et al. |
| 2022/0086189 A1 | 3/2022 | Nguyen et al. |
| 2022/0086190 A1 | 3/2022 | Nguyen |
| 2022/0086193 A1 | 3/2022 | Nguyen et al. |
| 2022/0329584 A1* | 10/2022 | Sharma ................ H04L 9/3263 |
| 2023/0039162 A1 | 2/2023 | Salter et al. |
| 2023/0244594 A1 | 8/2023 | Bansal et al. |
| 2023/0259831 A1 | 8/2023 | Karanth et al. |

FOREIGN PATENT DOCUMENTS

| | | |
|---|---|---|
| WO | 2017/138944 A1 | 8/2017 |
| WO | 2022/060609 A1 | 3/2022 |

OTHER PUBLICATIONS

"BPF maps", the kernel development community, available online at <http://web.archive.org/web/20230604211709/https://docs.kernel.org/bpf/maps.html>, Jun. 4, 2023, 2 pages.

"Google Plus Users", Google+Ripples, Oct. 31, 2011 [retrieved on Feb. 21, 2012 from Internet at http://www.googleplusers.com/google-ripples.html], 3 pages.

"Rightscale 2019 State of the Cloud Report" Flexera, 2019.

Bertrone, et al., "Toward an eBPF-based clone of Iptables", Jul. 2018, pp. 1-5.

Di Pietro, G., "How to observe your network with eBPF", available online at <https://isitobservable.io/observability/kubernetes/how-to-observe-your-network-with-ebpf>, Oct. 14, 2022, pp. 1-7.

Final Office Action, U.S. Appl. No. 16/948,399, Jul. 6, 2023, 10 pages.

International Preliminary Report on Patentability, PCT App. No. PCT/US21/49484, Mar. 30, 2023, 8 pages.

International Search Report and Written Opinion dated Dec. 3, 2021, in Application No. PCT/US2021/049484 [SLFCP322WO], 13 pages.

Non-Final Office Action, U.S. Appl. No. 16/948,399, Jan. 23, 2023, 12 pages.

Shahin, Mojtaba, Muhammad Ali Babar, and Liming Zhu. "Continuous integration, delivery and deployment: a systematic review on approaches, tools, challenges and practices." IEEE Access 5 (2017): 3909-3943.

Spinnaker: Cloud Native Continuous Delivery: Fast, safe, repeatable deployments for every Enterprise, Webpage, Accessed: Jan. 20, 2021.

Wikipedia, "Netfilter", available online at <https://en.wikipedia.org/wiki/Netfilter>, last edited Apr. 21, 2023, 8 pages.

\* cited by examiner

```
{
  {
    "datacenter": "datacenter1",                    ─── 204
    "functional_domains": [
      {
        {
          "name": "fd1",
          "sfdc_security_groups": [
            {
              "k8s_cluster_names": [
                "logging",
                "monitoring"
              ],
              "name": "Logging_Monitoring",         ─── 208
  220 ─── "policies": [
              {
  224 ─── "destination": {
                  "services": ["proxy"]
                  "groups": ["Processing"]
                },
  228 ─── "source": {
                  "services": ["all"]
                }
              },
              {
  232 ─── "destination": {
                  "services": ["service1", "service2", "service3"]
                },
  236 ─── "source": {
                  "services": [
                    "service4",
                    "service5",
                    "service6",
                    "service7",
                    "service8"
                  ]
                }
              }
            ],
  240 ─── "public": false,
  242 ─── "security_group_cidr": "10.0.0.0/12",
  244 ─── "security_group_functionality": "Logging_Monitoring",
          "security_group_name": "DC.Test.Logging_Monitoring",
  248 ─── "service_name": [
```

FIG. 2A

```
        "service4",
        "service5",
        "service6",
        "service7",
        "service8",
        "service9",
        "service10"
    ],
    "service_instances": [
        {
            name: "service4",
            port:   443,
            protocol: "tcp"
        },
        ...
    ]
},
{
    "name": Processing,  ⎯212
    "security_group_cidr": "10.16.0.0/12",
    "security_group_functionality": "Processing",
    "security_group_name": "DC.Test.Processing",
    "service_name": [
        "service1",
        "service2",
        "service3"
    ],
    "service_instances": [
        {
            "name": "service1",
            "port": 443,
            "protocol": "tcp"
        },
        {
            "name": "service2",
            "port": 587,
            "protocol": "udp"
        },
        {
            "name": "service3",
            "port": 80,
            "protocol": "tcp"
        }
    ]
},
{
```

FIG. 2A (Cont.)

```
"name": Gateway,  ⸺216
"service_name": [
    "proxy"
],
"service_instances": [
    {
        "name": "proxy",
        "port": 8443,
        "protocol": "tcp"
    }
]
},
{
    "name": "fd2",
    ...
}
]
}
}
```

FIG. 2A (Cont.)

```
                                                           200B
                                                         /
         security_group: DC.Test.Logging_Monitoring  ~-250
              - subnet: 10.0.0.0/12  ~-252
              - service_name:  ~-254
                 - "service4",
                 - "service5",
                 - "service6",
                 - "service7",
                 - "service8",
                 - "service9",
                 - "service10"
         public:false  ~-256
         policies:
         - description: Policy allowing DC.Test.Logging_Monitoring to
           DC.Test.Processing  ~-258
              communication
  262 -~  source:
            securityGroup: DC.Test.Logging_Monitoring
  264 -~  destination:
            securityGroup: DC.Test.Processing
  266 -~  services:
            - description: tcp443/service1  ~-268
              protocol: tcp  ~-272
  270 -~     destPorts: '443'
            - description: service2
              protocol: udp
              destPorts: '587'
            - description: service3
              protocol: tcp
              destPorts: '80'

- description: Policy allowing DC.Test.Logging_Monitoring to
           DC.Test.Gateway ~-260
              communication
           source:
              securityGroup: DC.Test.Logging_Monitoring
           destination:
              securityGroup: DC.Test.Gateway
           services:
            - description: proxy
              protocol: tcp
              destPorts: '8443'
```

FIG. 2B

PROCESSING A PLURALITY OF PACKETS AT A HIGHER LAYER OF A NETWORK STACK, WHERE AT LEAST ONE PACKET OF THE PLURALITY OF PACKETS WAS PREVIOUSLY DETERMINED, AS PART OF PROCESSING THE AT LEAST ONE PACKET AT LOWER LAYERS OF THE NETWORK STACK, TO BE AUTHORIZED TO BE PROCESSED BY THE HIGHER LAYER BASED ON A DETERMINATION THAT THE AT LEAST ONE PACKET IS ASSOCIATED WITH A HANDSHAKE PROCESS TO ESTABLISH AN ENCRYPTED CONNECTION, WHERE THE AT LEAST ONE PACKET IS DESTINED FOR A DESTINATION ADDRESS ASSOCIATED WITH AN INSTANCE OF A FIRST SERVICE, WHEREIN THE AT LEAST ONE PACKET WAS SENT USING A SOURCE ADDRESS, WHERE PACKETS SENT USING THE SOURCE ADDRESS ARE OTHERWISE CONFIGURED TO BE UNAUTHORIZED TO BE PROCESSED BY THE HIGHER LAYER, AND WHERE THE PROCESSING AT THE HIGHER LAYER INCLUDES THE FOLLOWING OPERATIONS
306

RESPONSIVE TO SUCCESSFUL AUTHENTICATION OF A CRYPTOGRAPHIC CERTIFICATE RECEIVED DURING THE HANDSHAKE PROCESS, IDENTIFYING FROM THE CRYPTOGRAPHIC CERTIFICATE A SECOND SERVICE, WHEREIN AN INSTANCE OF THE SECOND SERVICE IS ASSOCIATED WITH THE SOURCE ADDRESS
308

DETERMINING, BASED ON A SECURITY POLITY THAT DEFINES THE FIRST AND SECOND SERVICE AS BEING RESPECTIVELY WITHIN A FIRST AND SECOND SEGMENT OF A NETWORK, THAT THE SECOND SERVICE IS AUTHORIZED TO ACCESS THE FIRST SERVICE
310

RESPONSIVE TO THE DETERMINATION, CAUSING A CONFIGURATION SUCH THAT PACKETS SENT USING THE SOURCE ADDRESS ARE NOW AUTHORIZED TO BE PROCESSED BY THE HIGHER LAYER
312

FIG. 3

MULTI-FACTOR NETWORK SEGMENTATION

CROSS-REFERENCE TO RELATED APPLICATIONS

This application claims the benefit of U.S. Provisional Application No. 63/516,454, filed Jul. 28, 2023, which is hereby incorporated by reference.

TECHNICAL FIELD

One or more implementations relate to the field of network segmentation; and more specifically, to the segmentation of services (e.g., services deployed in a cloud environment) on a network using multiple identities of each service.

BACKGROUND ART

In a service-oriented software design, each service is a discrete unit of functionality that can be accessed remotely and acted upon. Different services can operate in concert to provide the functionality of a larger application (e.g., software-as-a-service (SaaS) in a cloud environment) that end users interact with. In such a case, such services are transparent to the end users and they communicate with each other to fulfil the requests from the end users. One example architecture of the service-oriented design is the microservice architecture where each service is fine-grained, for example, to facilitate flexibility in development, deployment, scaling, etc.

Such services are typically deployed and hosted on a network of a software provider (e.g., a SaaS provider on a cloud platform) and organized in segments (e.g., logical segments) of the network (also referred to as network segments). A network segment may be defined based on the characteristics of the data handled by services. For example, the services that store sensitive customer information (e.g., personal identifiable information, credit card information, etc.) may be defined as a network segment whereas other services may be defined as different network segment(s). A network segment may be defined based on the functions performed by services. For example, the services that handle data processing may be defined as a network segment. As another example, the services that monitor system behaviors (e.g., logging) may be defined as a network segment. The definition of which service(s) make up a network segment may be included in a security policy document.

Such services may be allowed to communicate with each other with no restrictions when they are within the same network segment. On the other hand, when they are located within different network segments, they may be allowed to communicate with each other only when they comply with certain security policy(s). For example, the services within a first network segment may be authorized to access only a subset of the services within a second network segment. As another example, only a subset of the services within the first network segment may be authorized to access any service within the second network segment. As yet another example, only a first service within the first network segment may be authorized to access a second service within the second network segment. Such security policies may be included in the security policy document as described above and may be enforced during operation.

During operation, enforcement of such security policy(s) against inbound network packets includes first authenticating an instance of a service that sends the network packets.

In some implementations, the networking address assigned to an instance of the service serves as the identity of the instance of the service for authentication purposes. For example, when one or more instances of a service is hosted on an electronic device in a cloud environment (e.g., an electronic device that hosts containerized services/applications (e.g., microservices)), each instance of the service may be dynamically assigned a networking address at runtime (e.g., an IP address according to the TCP/IP networking protocol, e.g., as part of assigning an IP address to a Kubernetes pod). Such a networking address (rather than the electronic device's static networking address) is included as the source networking address in the network packets and may serve as the identity of an instance of the service. Subsequently, authorization of the instance of the service may be performed relative to its assigned networking address according to networking address-based access control rule(s) (e.g., packet filtering rules) that are based on the security policy document as described above. The authorization may be performed in the lower layers of the network stack of the electronic device (e.g., internet and transport layers of the network stack that is a software implementation of the TCP/IP networking protocol suite). Such an approach provides "defense in depth" such that potential attacks on an instance of a service that is deployed in a higher layer (e.g., the application layer) of the network stack can be stopped before they reach the higher layer.

In other implementations, a cryptographic identity assigned to the service serves as the identity of instances of the service. For example, the software provider of the service may implement a certificate authority that issues a cryptographically verifiable document (e.g., an X.509 certificate or a javascript object notation (JSON) web token) for each service (e.g., a microservice). Each cryptographically verifiable document includes a unique cryptographic identity of the service. During operation, an instance of a service may be authenticated relative to the unique cryptographic identity of the service. Subsequently, authorization of the instance of the service may be performed also relative to the cryptographic identity of the service according to converted security policies(s) that are cryptographic identity-based and that are created based on the same security policy document as described above. The authorization may be performed in a higher layer (e.g., within the code for the service in the application layer) of the network stack. Such an approach is based on a zero trust architecture and provides defense from potential attacks where the service is deployed.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2A shows an example of a security policy document 200A in javascript object notation (JSON) format according to some example implementations.

FIG. 2B shows an example of a security policy document 200B in yet another markup language (YAML) format according to some example implementations.

FIG. 3 is a flow diagram illustrating one aspect of network segmentation using multiple identities of a service according to some example implementations.

DETAILED DESCRIPTION

The following description describes implementations for enforcing security policies for communications between services in different segments of a network (e.g., a network used by a software provider to implement services (e.g., SaaS) in a cloud environment) where the enforcement is based on multiple identities of each service, e.g., a cryptographic identity and a networking address. For example, when an instance of a first service within a first segment of a network requests access to an instance of a second service within a second network segment, the authorization of the request is first performed successfully relative to the cryptographic identity (e.g., an identity in an X.509 certificate) of the first service. More specifically, the authorization is performed, based on a cryptographic identity-based security policy that is converted from a generic security policy, in a higher layer (e.g., the application layer that is implemented according to a higher layer protocol such as hypertext transfer protocol (HTTP), transport layer security (TLS), etc.) of a network stack (e.g., a TCP/IP network stack) that is implemented in the electronic device that hosts the second service. And the authorization is performed in a network segmentation engine in the higher layer that is separate from the implementation of the second service. Based on successful authorization of the request in the higher layer of the network stack, the networking address assigned to the instance of the first service is added to an access control rule (e.g., a packet filtering rule) in the lower layers of the network stack (e.g., the internet and transport layers). More specifically, the access control rule is based on the same generic security policy above and authorizes future requests if they are sent using the same networking address as the networking address assigned to the instance of the first service.

Figure 1A:
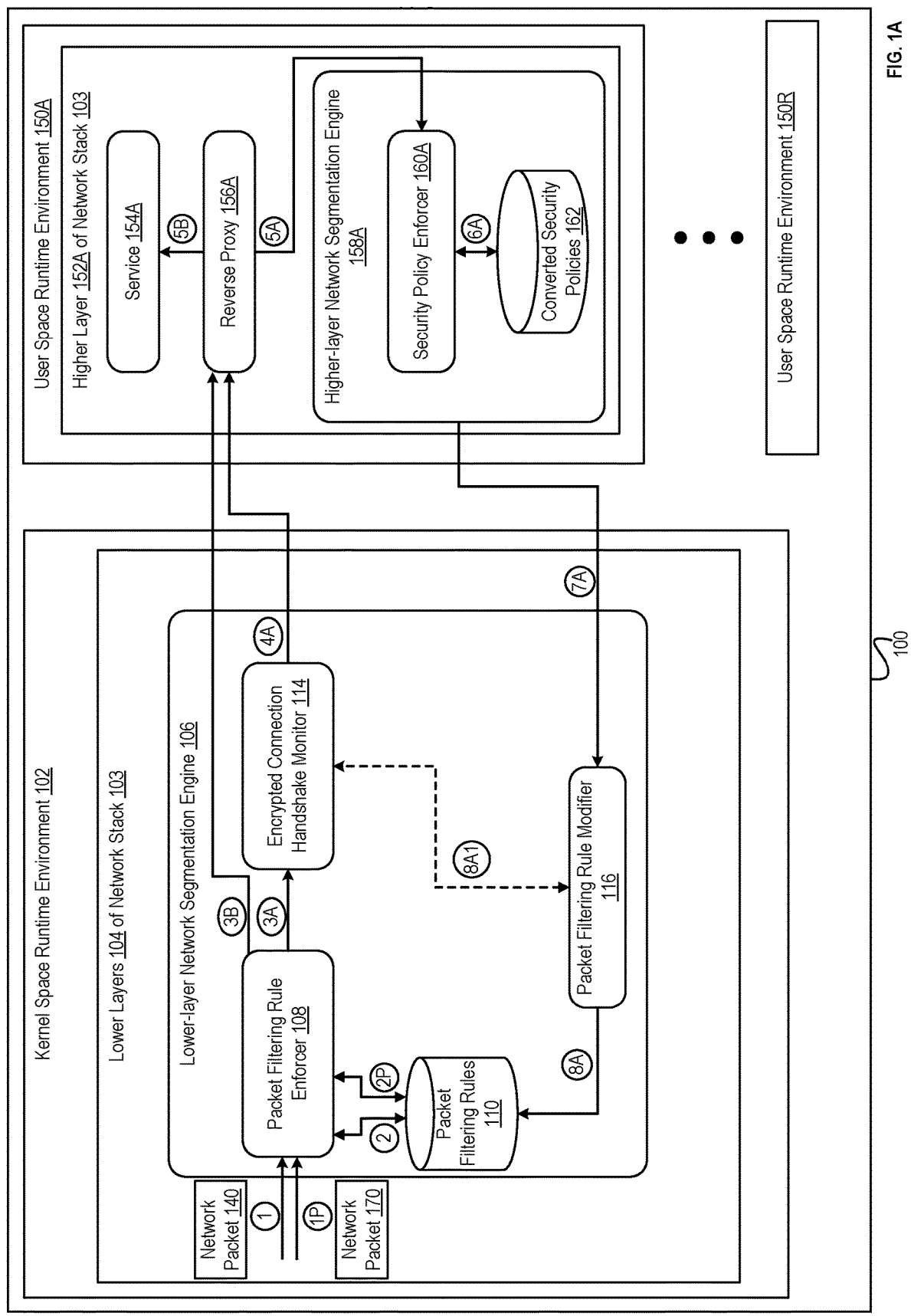
FIG. 1A is a block diagram illustrating one aspect of network segmentation using multiple identities of a service according to some example implementations.

FIG. 1A is a block diagram illustrating one aspect of network segmentation of services using multiple identities of each service according to some example implementations. An electronic device 100 includes a kernel space runtime environment 102 and one or more user space runtime environments 150A-R. For the sake of clarity and conciseness, other runtime environment(s) that may be implemented in the electronic device 100 are not illustrated.

The electronic device 100 (e.g., an electronic service 200 shown in FIG. 4A that operates as a server device) hosts instance(s) of one or more services (e.g., microservices), such as an instance like a service 154A in a user space runtime environment 150A on the electronic device 100. Instance(s) of service(s) hosted on one or more electronic devices such as the electronic device 100 constitute an instance of a larger application (e.g., software-as-a-service (SaaS) in a cloud environment) that end user(s) interact with.

Such electronic devices are part of a network ("multi-segment network") (e.g., network 204 as described in FIG. 2A) of a software provider (e.g., a SaaS provider on a cloud platform), e.g., that is implemented using network virtualization (e.g., software defined network (SDN), network functions virtualization (VFN), etc.). Services hosted on the multi-segment network are organized in segments (also referred to as network segments) (e.g., network segments 208, 212, and 216 as described in FIG. 2A). The definition of which service(s) constitute a network segment may be included in a generic security policy document (e.g., the security policy document 200A as described in FIG. 2A).

The kernel space runtime environment 102 is a runtime environment where an operating system kernel of the electronic device 100 runs. A network stack 103 is an implementation of the abstraction layers of a networking protocol suite (e.g., a TCP/IP protocol suite). Lower layers 104 of the network stack 103 represent the implementation of the part of the network stack 103 that operates in the kernel space runtime environment 102. In the case of the network stack 103 being implemented based on TCP/IP, the networking hardware (e.g., a network interface controller, such as network interface(s) 424 shown in FIG. 4A) is an implementation of a link layer. And the lower layers 104 may be multiple lower layers of software implementation that implement an internet, transport, and application abstraction layer. For example, a first lower layer may implement a first interface between the networking hardware and a second lower layer that implements the internet abstraction layer. Such a first lower layer is typically associated with a device driver. A third lower layer may implement the transport abstraction layer. A fourth lower layer may implement a second interface between the third lower layer and a higher layer (e.g., a higher layer 152A) of the network stack 103 that implements the application abstraction layer. Such a fourth lower layer is typically a socket interface (e.g., Berkely sockets, Winsock, etc.). In some implementations, the kernel space runtime environment 102 is part of a guest operating system's kernel space. In other implementations, the kernel space runtime environment 102 is part of a network namespace in containerized environment.

During operation, the lower layers 104 process both inbound and outbound network packets and move them through the layers and to or from a higher layer of network stack 103, e.g., according to a networking protocol suite (e.g., TCP/IP).

User space runtime environments 150A-R represent one or more runtime environments where an instance of a service (also referred to as a service instance) (e.g., a service 154A, which is an instance of a service such as service1 as described in FIG. 2A) runs in each. Example implementations of such runtime environments may include a Kubernetes pod and a multi-container Docker application instance where more than one container/process run and share resources in the same runtime environment.

Service instances (e.g., the service 154A) in the user space runtime environments 150A-R are instances of services that are defined as part of a first segment of the multi-segment network (e.g., service1 of the network segment 212 as described in FIG. 2A) according to the same generic security policy document above. Each service instance may be dynamically assigned a networking address at runtime (e.g., an IP address according to the TCP/IP protocol, e.g., as part of assigning an IP address to a Kubernetes pod). Such a networking address (rather than the electronic device's 100 static networking address) is included as the destination address in network packets destined for the corresponding service instance. Such a networking address is also included as the source networking address in network packets sent from the corresponding service instance.

Returning to the kernel space runtime environment 102, a lower-layer network segmentation engine 106 is part of the network security infrastructure implementation of the multi-segment network and may be implemented at various locations in the lower layers 104 to perform filtering of inbound network packets to either deny or authorize their further movement in the network stack. While in one implementation the lower-layer network segmentation engine 106 is implemented just before the processing of network packets at the first lower layer in the example above, in other implementations it is implemented at different locations (e.g., as part of the processing of network packets at the first lower layer, just before the processing of network packets at the second lower layer in the example above, as part of the processing of network packets at the second lower layer, etc.). The lower-layer network segmentation engine 106 may be implemented based on an extended Berkeley Packet Filter (eBPF), which is a technology that allows for running user space software programs in the kernel space of an operating system. The filtering of network packets in the lower-layer network segmentation engine 106 may operate in addition to or in concert with the filtering of network packets implemented in the kernel code for the lower layers 104 (e.g., kernel modules such as ip_tables, ip6_tables, arp_tables, etc.).

The lower-layer network segmentation engine 106 may perform one or more operations to determine whether each of the inbound network packets that are sent from outside the first segment is authorized to move further in the network stack 103, e.g., to be processed by a higher layer of the network stack 103. It may first enforce packet filtering rules based on the source networking address of each packet. For example, at operation 1, a packet filtering rule enforcer 108 receives a network packet 140 (e.g., that is an inbound network packet). The network packet 140 includes a source networking address identifying the networking address of an instance of a remote service (e.g., service4 as described in FIG. 2A) ("remote service instance") that has sent the network packet 140 where the remote service instance is hosted within a second segment of the multi-segment network (e.g., the network segment 208 as described in FIG. 2A). The network packet 140 also includes a destination networking address identifying the networking address of the service 154A. In response, the packet filtering rule enforcer 108 determines the source networking address of the network packet 140 is one of the valid networking addresses (e.g., a pool/range of IP addresses that are owned by the software provider to which the multi-segment network belongs). In such a manner, using the source networking address as an identity, the packet filtering rule enforcer 108 has authenticated the remote service instance.

Following authentication, at operation 2, the packet filtering rule enforcer 108 determines whether there is a packet filter rule in packet filtering rules 110 that accept network packets sent using the source networking address of the network packet 140. The packet filtering rules 110 includes packet filtering rules that are based on security policies (e.g., the second policy that is defined by the source 236 and destination 232 as described in FIG. 2A) in the generic security policy document as described above.

Continuing with operation 2, the packet filtering rule enforcer 108 may determine that no existing packet filtering rules accept network packets sent using the source networking address of the network packet 140. Such a configuration alone would have caused the network packet 140 to be blocked from moving further in the network stack 103 (e.g., to be processed by a higher layer of the network stack 103). However, in such a situation, the lower-layer network segmentation engine 106 may perform additional operation(s) with respect to the payload of each inbound network packet. For example, following the operation 2's determination above, in response, at operation 3A, an encrypted connection handshake monitor 114 is invoked to determine whether the payload of the network packet 140 is associated with performing a handshake for establishing an encrypted connection (e.g., a TLS handshake), e.g., after a TCP connection has been established (e.g., with a reverse proxy 156A in the higher layer 152A of the network stack 103). Examples of a payload that is associated with performing a TLS handshake include a ClientHello message, a Certificate message, etc.

In response to operation 3A, the encrypted connection handshake monitor 114 may determine that the payload of the network packet 140 is associated with performing a TLS handshake between the remote service instance and the service 154A. In such a case, at operation 4A, the encrypted connection handshake monitor 114 forwards the network packet 140 to be processed by the higher layer 152A of the network stack 103, specifically, the reverse proxy 156A. In some implementations, the network packet 140 is forwarded for additional processing by other lower layer(s) in the lower layers 104 before being forwarded to the higher layer 152A for processing.

As shown, the higher layer 152A of the network stack 103 represents the logical grouping of the service 154A, the reverse proxy 156A, and a higher-layer network segmentation engine 158A. As a person skilled in the art would appreciate, in some cases, the service 154A alone may be deemed the higher layer 152A of the network stack 103.

A reverse proxy (e.g., the reverse proxy 156A) and a higher-layer network segmentation engine (e.g., the higher-layer network segmentation engine 158A) are part of the network security infrastructure implementation. The reverse proxy may perform one or more functions on network traffic to/from the lower layers 104 of the network stack 103 and network traffic to/from a service instance within the same higher layer of the network stack 103. These functions may include (1) performing a TLS or mutual TLS (mTLS) handshake; (2) terminating an encrypted connection (e.g., a TLS connection); and (3) forwarding data in inbound network packets (e.g., inbound application layer data) to the service instance for processing, e.g., using an unencrypted connection after an encrypted connection (e.g., a TLS connection) is terminated; and (4) determining whether data in inbound network packets is authorized to be processed by the service instance (e.g., the service 154A). A higher-layer network segmentation engine (such as the higher-layer network segmentation engine 158A) performs authorization of a service instance relative to the cryptographic identity of the service corresponding to the service instance.

The code for such an infrastructure-level reverse proxy or higher-layer network segmentation engine is separate from the code for a service (e.g., the service 154A). An instance of such code is deployed separately from but alongside the code for a service to each of the user space runtime environments 150A-R. Examples of such an implementation are the side car models implemented in Kubernetes and Docker. Accordingly, each of the user space runtime environments 150A-R respectively includes an instance of a service, an instance of the code for the infrastructure-level reverse proxy, an instance of the code for the infrastructure-level higher-layer network segmentation engine. In some implementations, the higher-layer network segmentation engine may be implemented as part of the reverse proxy. The reverse proxy may be implemented using software such as Nginx, Envoy, and the like.

In response to operation 4A, the reverse proxy 156A determines the payload of the network packet 140 is associated with performing a TLS handshake and, in response, performs (e.g., on behalf of the service 154A) one or more operations ("mutual TLS (mTLS) handshake operation(s)") (not shown) to perform the TLS handshake between the remote service instance and service 154A using mutual authentication. Unlike the default TLS authentication method, mTLS requires a client to prove its identity to a server in addition to requiring the server to prove its identity to the client. These mTLS handshake operation(s) send and receive additional TLS handshake network packet(s) (not shown) respectively to and from the remote service instance through the lower layers 104 of the network stack 103. These network packets traverse the lower layers 104 of the network stack 103 in the same path of the network packet 140, which similarly triggers operations 1, 2, 3A, and 4A. More specifically, just like for the network packet 140, at operation 2, it is determined that no existing packet filtering rules accept network packets sent using the source networking address of any of these network packets. And at operation 3A, it is determined that the payload of each of these network packets is associated with performing a TLS handshake between the remote service instance and the service 154A.

During the mTLS handshake operation(s), the reverse proxy 156A may receive (e.g., in a network packet that includes a Certificate message) from the remote service instance a cryptographic certificate (e.g., an X.509 certificate) that includes a cryptographic identity (e.g., a secure production identity framework for everyone (SPIFFE) Id) of the remote service.

Such a certificate may be issued by a certificate authority (not shown) implemented (e.g., using the SPIFFE authentication standard) by the software provider that has implemented the remote service. Such a certificate authority (also referred to as a trust domain or trust boundary) may issue a cryptographic certificate to services deployed in one or more networks (e.g., network 204 as described in FIG. 2A). Each cryptographic certificate may include a cryptographic identity (e.g., a SPIFFE ID in the format of spiffe://trust domain/ workload identifier, such as spiffe://companyA.com/ system_monitoring/logging) that is a unique identifier of a service for authentication purposes. That is, during operation, different instances of a service may present the same certificate that is issued to the service and may be authenticated based on the same certificate. In such a manner, different instances of different services may query the same certificate authority (e.g., by invoking its API(s)) to authenticate the identity of a service when being presented with a cryptographic certificate by an instance of the service.

Continuing with the example above, in response to receiving the cryptographic certificate from the remote service instance, the reverse proxy 156A may query the certificate authority associated with the cryptographic certificate and may determine that the cryptographic identity of the remote service is valid.

Following authentication, the higher-layer network segmentation engine 158A is invoked to perform authorization of the remote service instance relative to the cryptographic identity of the remote service. Continuing with the example above, at operation 5A, a security policy enforcer 160A in higher-layer network segmentation engine 158A may receive a request (e.g., via API(s)) for determining whether the remote service instance is authorized to access the service 154A based on the cryptographic identity identified in the received cryptographic certificate. In response, at operation 6A, the security policy enforcer 160A determines whether there is a security policy in converted security policies 162 that authorizes a service with such a cryptographic identity to access the service 154A.

The converted security policies 162 include security policies that are converted from policies that are in the same generic security policy document as described above (i.e., from which the packet filtering rules in the packet filtering rules 110 are created). Unlike the packet filtering rules, which are based on networking addresses, the converted security policies are based on cryptographic identities (e.g., SPIFFE IDs). Such converted security policies may be created using a process similar to how a policy input (e.g., policy input 106) is converted (e.g., by converter 104) to an internal representation of the policy input as described in detail in U.S. patent application Ser. No. 16/948,399, filed Sep. 16, 2020, and titled, "Network security orchestration and management across different clouds." An example cryptographic identity-based security policy may be defined as follows:

```
{
  "destination": {
    "services": [
      "spiffe://companyA.com/data_processing/sub_processing1",
      "spiffe://companyA.com/data_processing/sub_processing2",
      "spiffe://companyA.com/data_processing/sub_processing3",
    ]
  },
  "source": {
    "services": [
      "spiffe://companyA.com/system_monitoring/logging1",
      "spiffe://companyA.com/system_monitoring/logging2",
      "spiffe://companyA.com/system_monitoring/logging3",
      "spiffe://companyA.com/system_monitoring/logging4",
      "spiffe://companyA.com/system_monitoring/logging5",
    ]
  }
}
```

Such a security policy is converted from the generic security policy defined by source 236 and destination 232 as described in FIG. 2A. Specifically, service1, service2, service3 in destination 232 are respectively converted to SPIFFE IDs "spiffe://companyA.com/data_processing/ sub_processing1," "spiffe://companyA.com/data_processing/sub_processing2," and "spiffe://companyA.com/data_processing/sub_processing3." Similarly, service4, service5, service6, service7, service8 in source 236 are respectively converted to SPIFFE IDs "spiffe://companyA.com/ system_monitoring/logging1," "spiffe://companyA.com/ system_monitoring/logging2," "spiffe://companyA.com/ system_monitoring/logging3," "spiffe://companyA.com/ system_monitoring/logging4," and "spiffe:// companyA.com/system_monitoring/logging5."

Continuing with operation 6A, the security policy enforcer 160A may determine, based on the converted security policy above, that the remote service instance is authorized to access the service 154A, e.g., because SPIFFEE ID "spiffe://companyA.com/system_monitoring/logging1" is the cryptographic identity identified in the cryptographic certificate sent by the remote service instance (i.e., an instance of service4) and "spiffe://companyA.com/ data_processing/sub_processing1" is cryptographic identity of the a service (i.e., service1) corresponding to the service 154A.

In response to successful authorization, the higher-layer network segmentation engine 158A may perform one or more operations to cause a configuration such that the network packets sent using the networking address assigned to the remote service instance are now authorized to be processed by the higher layer 152A of the network stack 103. For example, following the operation 6A's determination, at operation 7A, the higher-layer network segmentation engine 158A may send (e.g., via API(s)) the remote service instance's networking address (and, in some implementations, the remote service's the cryptographic identity) (or otherwise make it available, such as allowing for the retrieval of it via API(s)) to a packet filtering rule modifier 116.

Continuing with operation 7A, packet filtering rule modifier 116 receives the remote service instance's networking address (or otherwise gain access to it) (e.g., via a mechanism implemented using an eBPF map, which allows for data sharing between a software program (e.g., the higher-layer network segmentation engine 158A) that executes in the user space and a software program (i.e., the lower-layer network segmentation engine 106) that executes in the kernel space).

In response, at operation 8A, based on the remote service instance's networking address (and, in some implementations, the remote service's the cryptographic identity), packet filtering rule modifier 116 causes a packet filtering rule to be added or modified in the packet filtering rules 110 such that the network packets sent using the remote service instance's networking address are now authorized by the lower-layer network segmentation engine 106 to be processed by a higher layer of the network stack 103. For example, the remote service may be service4 as described in FIG. 2A, the service 154A may be an instance of service as described in FIG. 2A, and such a packet filtering rule may be based on the generic security policy defined by source 236 and destination 232, as described in FIG. 2A. Specifically, the rule may be defined as follows:

| Rule no. | Permission | Protocol | Source IP Address(es) | Destination IP Address(es) | Port |
|---|---|---|---|---|---|
| 1 | Accept | TCP | 10.12.12.12 | Any | 443 |

In packet filtering rule no. 1 above, source IP address 10.12.12.12 is the remote service instance's assigned networking address and port 443 is the common port number on which the remote service instance and service 154A listen for inbound network traffic. Also as shown in the rule, "Any" is the value for the destination IP address(es) that represent the service(s) identified in destination 232 that listen for inbound network traffic on port 443 (e.g., service1). In some implementations, the packet filtering rules 110 may store rules that do not directly store IP address(es) (e.g., 10.12.12.12) and may only store a reference to the IP address(es) that are maintained separately from the packet filtering rules 110 (e.g., using a utility and/or kernel module, such as IP sets (also referred to as IP set or ipset). In such implementations, IP addresses that are associated with the same cryptographic identity may be used to create a set that is labeled with the cryptographic identity and may be referenced by the cryptographic identity in the packet filtering rules 110.

In some implementations, operation 8A may be performed only after a determination that the mTLS handshake as described above has successfully completed between the remote service instance and service 154A. For example, in response to receiving the remote service instance's networking address (as described above), at operation 8A1, the packet filtering rule modifier 116 invokes the encrypted connection handshake monitor 114 to check the status of the mTLS handshake (e.g., periodically, such as according to a predefined frequency) and in response the encrypted connection handshake monitor 114 may indicate whether the mTLS handshake has successfully completed. For instance, the encrypted connection handshake monitor 114 may implement a state machine for the mTLS handshake to keep track of the status of each expected TLS handshake message. In response to an indication of successful completion of the mTLS handshake, operation 8A may be performed as described above.

Being now configured with such a packet filtering rule as the packet filtering rule no. 1, the lower layers 104 of the network stack 103 authorizes future network packets sent using the remote service instance's networking address. For example, at operation 1P, the packet filtering rule enforcer 108 may receive a network packet 170 that is carried over the encrypted connection as established by the mTLS handshake above. The network packet 170 includes a source networking address identifying the networking address of the remote service instance and a destination networking address identifying the networking address of the service 154A. In response, the packet filtering rule enforcer 108 authenticates the remote service instance similarly to how the remote service instance was authenticated with respect to the network packet 140 as described above. Following authentication, operation 2P is performed to determine whether there is a configuration (e.g., a packet filter rule in packet filtering rules 110) that accepts network packets sent using the source networking address of the network packet 170. As a result, the packet filtering rule enforcer 108 determines that such a configuration (i.e., packet filtering rule no. 1 above) exists and accepts the network packet 170. In response, at operation 3B, the packet filtering rule enforcer 108 forwards the network packet 170 to be processed by the higher layer 152A of the network stack 103, specifically, the reverse proxy 156A. In response, at operation 5B, the reverse proxy 156A determines the payload of the network packet 140 includes higher layer data (e.g., application layer data) and, in response, forwards the data for processing by the service 154A.

The higher-layer network segmentation engine 158A and lower-layer network segmentation engine 106 described herein provide several advantages over the prior art. Networking address (IP)-based enforcement of security policies that controls network traffic between services in different segments of a network may result in undesirable outcomes. Specifically, each instance of the same service is typically assigned a different IP address dynamically at runtime. Also, when an existing instance of a service is terminated (e.g., as part of the termination of a Kubernetes pod), a replacement instance of the service is typically assigned a different IP address. Accordingly, network packets sent using such different IP addresses may be denied access to the destination services, e.g., if such different IP addresses are not recognized as authorized IP addresses (e.g., in internet and transport layers of a TCP/IP network stack).

One typical solution to such a problem is to enforce such security policies based on a block of IP addresses (e.g., in a format such as "10.0.0.0/12") instead. For example, a security policy that authorizes a first service within a first network segment to access a second service within a second network segment may be implemented as a rule that stipulates that access to the port of the second service is granted for network packets sent using any IP address in a block of IP addresses that are reserved for the first network segment. Such a block may be part of a larger block of IP addresses that are reserved for the entire network (e.g., according to the request for comment (RFC) 1918 standards). However, such a solution exposes destination services to more security risk (also referred to as attack surface) than necessary. For example, continuing with the example above, there may be other service(s) within the first network segment that are unauthorized to access the second service according to the security policy. The rule would authorize these service(s) to access the second service at its port number.

Here, even when the IP address of an instance of a service is currently unauthorized based on IP address-based access control rules in the lower layers of a network stack, the lower-layer network segmentation engine 106 allows network traffic from such service instance to move through the lower layers of the network stack so that the higher-layer network segmentation engine 158A may enforce such security policies at a higher layer (e.g., the application layer) of the network stack based on an immutable cryptographic identity (e.g., a SPIFFE ID) of a service. In such a manner, the above issues that arise from the dynamic nature of the IP addresses assigned to instances of services are avoided. Specifically, different instances of the same source service with different IP addresses are authorized to access a destination service instance if the source service is authorized according to a security policy. Additionally, network traffic may be reduced due to the elimination of the retransmission of network packets that would have been rejected based on IP address-based access control rules. As a result, the processing of such retransmitted network packets may also be eliminated.

Further, the higher-layer network segmentation engine 158A is implemented and deployed as part of the network security infrastructure. In comparison to the typical implementation of enforcing security polices being within the code for the service(s) (and hence being left at the discretion of the developer(s) of the service(s)), the infrastructure-level implementation described here allows for consistent enforcement of security policies across all the services.

Even further, such authorization outcome(s) are further used to automatically create an IP address-based access control rule that is enforced by the lower-layer network segmentation engine 106 in lower layers of the network stack. Such a technique allows for defense in depth that stops potential attacks before they reach the higher layer. Additionally, such a technique eliminates the need for manually maintaining the IP address(es) of the access control rule(s) in the lower layers of a network stack as these IP address(es) are reassigned (e.g., to instances of unauthorized service(s)) or as new IP address(es) are assigned to instance(s) of an authorized service.

Figure 1B:
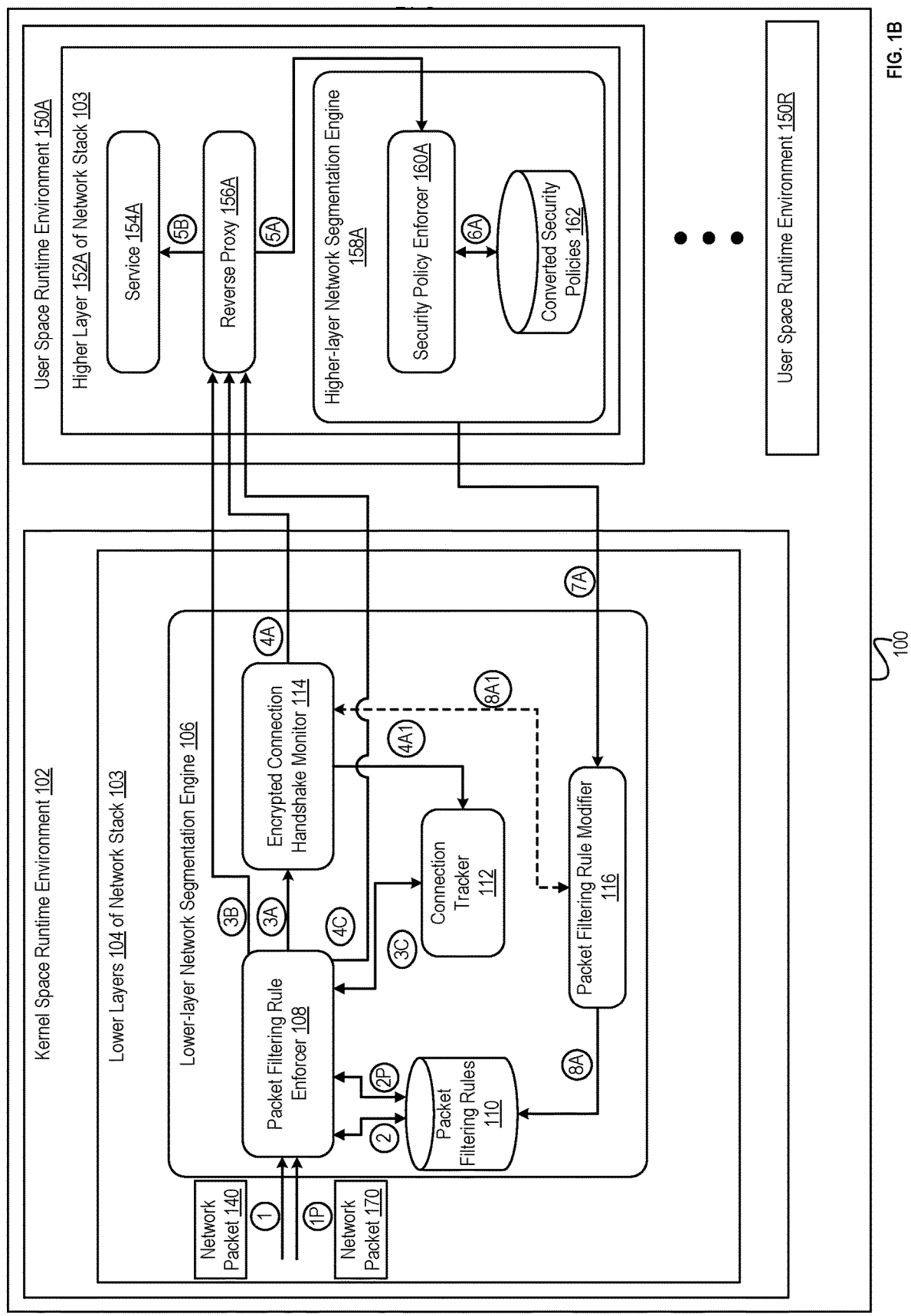
FIG. 1B is a block diagram illustrating another aspect of network segmentation using multiple identities of a service according to some example implementations.

FIG. 1B is a block diagram illustrating another aspect of network segmentation using multiple identities of a service according to some example implementations.

In some implementations, the lower-layer network segmentation engine 106 may determine whether inbound network packets are authorized to be processed by a higher layer of the network stack 103 based on the connection on which the network packets are transmitted. For example, illustrating using the path in which the network packet 140 traverses the lower layers 104 of the network stack 103 as described in FIG. 1A, in response to operation 3A, it may be determined that the payload of the network packet 140 includes the first message in the TLS handshake (e.g., a ClientHello message). In response to this determination, the encrypted connection handshake monitor 114 performs operation 4A1 before operation 4A. Specifically, the encrypted connection handshake monitor 114 may add a data record to a connection tracking data table (not shown) that records the following data: 1) the remote service instance's IP address, 2) the remote service instance's port number, 3) the service's 154A IP address, and 4) service's 154A port number. Such a connection tracking data table may be implemented independently from any connection tracking mechanism implemented at a different lower layer of the network stack 103 (e.g., TCP connection tracking at the transport layer). Such a data record ("existing connection 1") represents an existing connection between these two service instances. The existing connection 1 may be removed from the connection tracking data table, e.g., when it is determined that the mTLS handshake has failed to complete successfully or after a predefined period of inactivity in the connection.

Following operation 4A1, operations 4A, 5A, 6A, 7A, and 8A are performed similarly to how they are performed as described in FIG. 1A except that the mTLS handshake operations are performed in conjunction with the connection tracker 112. Specifically, the network packets associated with the mTLS handshake operations that follow the network packet 140 may be authorized by the packet filtering rule enforcer 108 to be processed by the higher layer 152A of the network stack 103 when it is determined (at operation 3C) they are associated with an existing connection (i.e., existing connection 1) before being forwarded (at operation 4C) to the higher layer 152A. However, in the event it is determined that mTLS handshake has failed to complete, network packets following such a determination may be blocked from moving further in the lower layers 104.

Further in such implementations, in the event that mTLS handshake has successfully completed (i.e., existing connection 1 still exists in the connection tracking data table), when the network packet 170 as described in FIG. 1A is received, it may be accepted based on the presence of the existing connection 1 (instead of the presence of the packet filtering rule no. 1). As a person skilled in the art would appreciate, such a connection-based operation allows for faster lookups.

Yet further in such implementations, when the existing connection 1 has been removed after a predefined period of inactivity in the connection, further network packets sent by the remote service instance using a new TCP connection to establish an encrypted connection handshake may be authorized to be processed by the higher layer 152A of the network stack 103 again based on the presence of the packet filtering rule no. 1.

In some implementations, the packet filtering rules 110 may include a generic rule that stipulates that network packets sent using an existing connection are authorized by the packet filtering rule enforcer 108 to be processed by the higher layer 152A of the network stack 103. In such implementations, the packet filtering rule enforcer 108 performs operation 3C only after it has determined the generic rule exists.

FIG. 2A shows an example of a security policy document 200A in JSON format, in accordance with some implementations, and FIG. 2B shows an example of a security policy document 200B in YAML format, in accordance with some implementations. Security policy documents 200A and 200B provide two examples of many different security policy documents based on which converted security policies as described in FIG. 1A may be created. In the examples of FIGS. 2A and 2B, a security infrastructure is declared for a network (e.g., an enterprise network) that is defined as a particular instance of a data center. In FIG. 2A, segments of the network (also referred to as network segments) are declared as security groups for the instance of the "datacenter1" data center (also referred to as a network 204 or network datacenter1). In this example, the network 204 include a first security group 208 (also referred to as network segment 208) named "Logging_Monitoring," a second security group 212 (also referred to as network segment 212) named "Processing," and a third security group 216 (also referred to as network segment 216) named "Gateway." As shown at 248, the list of service4, service5, service6, service7, service8, service9, and service 10 constitutes the network segment 208. Also as shown in the attribute "service name" under 212, the list of service1, service2, and service3 constitute the network segment 212. In other examples of security policy documents, additional security groups/network segments with other names can be included in the declared network.

At 220 of FIG. 2A, security policies are declared for the "Logging_Monitoring" group 208. There can be zero policies, one policy, or any number of policies declared for a particular security group. In the example of FIG. 2A, each policy has at least two fields: a destination, and a source. The destination as well as the source of a policy can specify services as well as security groups. Thus, specific services and/or security groups can be identified and user-customized. There can be one or many services and/or groups set for the particular policy. In this example, a first policy is characterized by destination 224 and source 228. A service and a group are named for destination 224, while "all" services are identified for source 228. Thus, there are no restrictions on which services can transmit data as a source for the first policy. A second policy is characterized by destination 232 and source 236. A different set of services is specified for destination 232, as is the case with the services listed for source 236. Thus, only the services identified in the source 236 are authorized to access the services identified in the destination 232 according to the second policy.

In the example of FIG. 2A, a "public" field 240 has a value of false, indicating that security group 208 is a private group as opposed to a public group. In other words, services in the security group are not exposed on the Internet or another data network. Thus, a port can be opened for services in this security group to accept incoming traffic from other internal services, that is, services within the instance of the data center in this example. At 242, an IP subnet range is defined for security group 208. This IP subnet range specifies that all services in the particular security group will get an IP address from the designated range of 10.0.0.0/12. At 244, a functionality of security group 208 is described, indicating in this example that the security group's function is logging and monitoring other services. A list of names of services in the security group is set forth at 248. Thus, when a security policy is looked up (e.g., during processing), the list of service names at 248 can be referenced. In this example, each service name in the list is unique, so a service can only belong to one security group.

In the example of FIG. 2B, a security group named "DC.Test. Logging_Monitoring" is identified at 250. Services in the group can draw an IP address from an IP subnet range identified at 252. For instance, when a service in security group 250 is deployed on an electronic device (e.g., a server device), the server device has to have an IP address in the designated subnet range at 252. A list of service names belonging to security group 250 is identified at 254, and a public or private designation as explained above is declared at 256.

In the example of FIG. 2B, at least two security policies are declared for the security group: a first policy described at 258, and a second policy described at 260. Each policy has a source and a destination specified, as well as services specified. For instance, a source 262, a destination 264 and a list of services 266 are specified for the policy described at 258. In this example, a different security group, "DC.Test-.Logging_Monitoring," is named for source 262, and "DC.Test.Processing" is named for destination 264. A list of services is named at 266 for policy 258. Each service named in list 266 is able to listen at a specific port or range of ports and accepts a specified protocol. For instance, the service named tcp443/service1 268 listens at a port 443, indicated at 270, and accepts only TCP traffic, as indicated at 272. Thus, each service in list 266 is characterized in terms of open ports and open protocols. The policy declared at 260 follows a similar format as the policy declared at 258.

FIG. 3 is a flow diagram illustrating one aspect of network segmentation using multiple identities of a service according to some example implementations. The exemplary operations illustrated in FIG. 3 are the operations for segmenting a network (e.g., the multi-segment network as described in FIG. 1A-B) using multiple identities of a service. The operations of FIG. 3 may be performed as described in further details with respect to FIGS. 1A-B.

At block 306, a plurality of packets is processed at a higher layer (e.g., higher layer 152A) of a network stack (e.g., network stack 103). At least one packet (e.g., network packet 140) of the plurality of packets may have been previously determined, as part of processing the at least one packet at lower layers (e.g., lower layers 104) of the network stack, to be authorized to be processed by the higher layer based on a determination that the at least one packet is associated with a handshake process to establish an encrypted connection (see circled 3A and 4A in FIG. 1A). The at least one packet may be destined for a destination address associated with an instance of a first service (e.g., service 154A). The at least one packet may have been sent using a source address. Packets sent using the source address may be otherwise configured to be unauthorized to be processed by the higher layer (e.g., configured to be blocked as described at circled 2 of FIG. 1A).

In some implementations, the determination that the at least one packet being associated with a handshake process includes determining that the at least one packet is a first packet of the handshake process (see circled 3A in FIG. 1B). In such implementations, responsive to the determination that the at least one packet is the first packet of the handshake process, a data record may be stored for the network connection associated with the handshake process (see circled 4A1 in FIG. 1B). In addition, responsive to receiving a first subsequent packet sent using the source address, it may be determined that the stored data record exists and, in response, the first subsequent packet may be authorized to move further in the lower layers of the network stack (see circled 3C and 4C in FIG. 1B). Further in such implementations, responsive to determining that the handshake process fails, the stored data record is removed. In addition, responsive to receiving a second subsequent packet sent using the source address, it may be determined that there is no data record for an existing network connection associated with the handshake process and, in response, the second subsequent packet may be denied further movement in the lower layers of the network stack.

More specifically, at block 306, the processing of the plurality of packets performs one or more operations (e.g., at blocks 308 and/or 310). The flow of operations moves to block 308, at which, responsive to successful authentication of a cryptographic certificate received during the handshake process, a second service (e.g., the remote service) is identified from the cryptographic certificate. The instance of the second service (e.g., the remote service instance) may be associated with the source address.

The flow of operations moves to block 310, at which, it is determined, based on a security policy (e.g., a converted security policy in converted security policies 162) that defines the first and second service as being respectively within a first and second segment of a network (e.g., the multi-segment network), that the second service is authorized to access the first service.

The flow of operations moves to block 312, at which, responsive to the determination, the lower layers are caused to be configured (e.g., with the packet filtering rule no. 1) such that packets sent using the source address are now authorized to be processed by the higher layer (see circled 7A, 8A1, 8A in FIG. 1A). In some implementations, this can be viewed as there being: 1) a configuration (during block 306) that causes processing at the lower layers to block packets sent using the source address unless the packets are associated with a handshake process to establish an encrypted connection; and 2) that configuration being modified (responsive to block 312) such that processing at the lower layers no longer blocks, based on the modified configuration (which may be referred to as a second configuration), packets sent using the source address. In some implementations, there may be another reason(s) one or more such packets are blocked at the lower layers, but it will not be due to this particular configuration; in other words, according to this particular second configuration the packets sent using the source address are now authorized to be processed at the higher layer, but one or more of them may be blocked during processing at lower layers due to some other configuration.

As a result of the second configuration, subsequent packets (e.g., a third subsequent packet such as network packet 170) sent using the source address may be received (see circled 1P in FIG. 1A). During processing of the these subsequent packets at the lower layers of the network stack, it will be determined, that these subsequent packet, according to this configuration, can be provided for processing by the higher layer of the network stack even though these subsequent packets may not be associated with the handshake process (see circled 2P and 3B in FIG. 1A). In fact, typically at least some subsequent packets that will be sent are unrelated to the handshake process (e.g., those packets that follow a successful encrypted connection handshake, which are network traffic to be carried over of the encrypted connection as opposed to network traffic associated with establishing the encrypted connection), and these subsequent packets will not be blocked from reaching the higher layer of the network stack based on the configuration.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing"

(and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
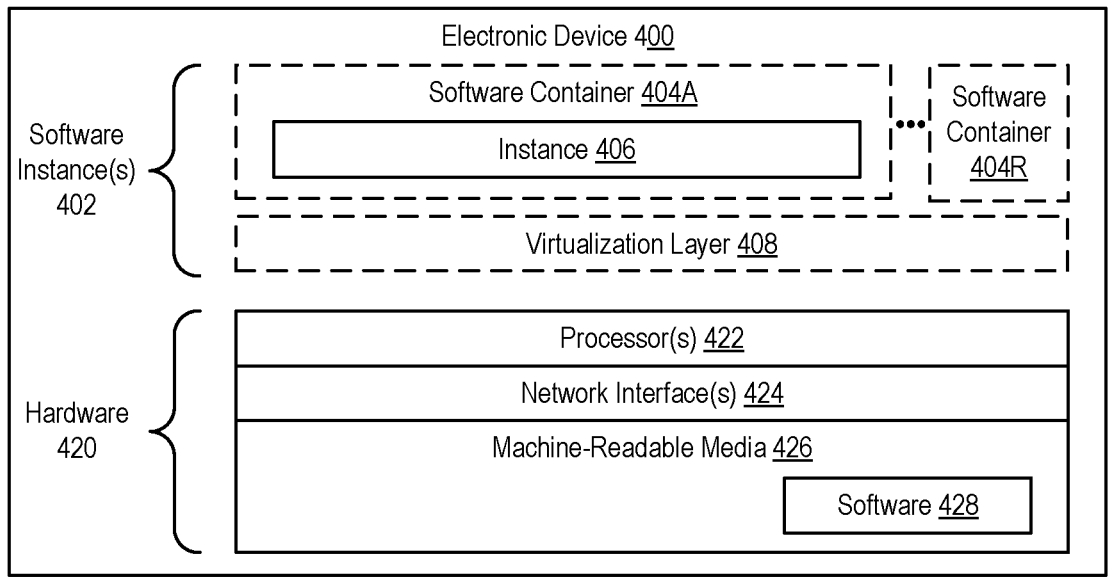
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the service instances (e.g., service 154A) may be implemented in one or more electronic devices 400. In one implementation: 1) each of the clients is implemented in a separate one of the electronic devices 400 (e.g., in end user devices where the software 428 represents the software to implement clients to interface directly and/or indirectly with the service instances (e.g., service 154A) (e.g., software 428 represents a web browser, a native client, a portal, a command-line interface, and/or an application programming interface (API) based upon protocols such as Simple Object Access Protocol (SOAP), Representational State Transfer (REST), etc.)); 2) the service instances (e.g., service 154A) are implemented in a separate set of one or more of the electronic devices 400 (e.g., a set of one or more server devices where the software 428 represents the software to implement the service instances (e.g., service 154A)); and 3) in operation, the electronic devices implementing the clients and the service instances (e.g., service 154A) would be communicatively coupled (e.g., by a network) and would establish between them (or through one or more other layers and/or or other services) connections for submitting request(s) to the service instances (e.g., service 154A) and returning response(s) to the clients. Other configurations of electronic devices may be used in other implementations (e.g., an implementation in which the client and the service instances (e.g., service 154A) are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
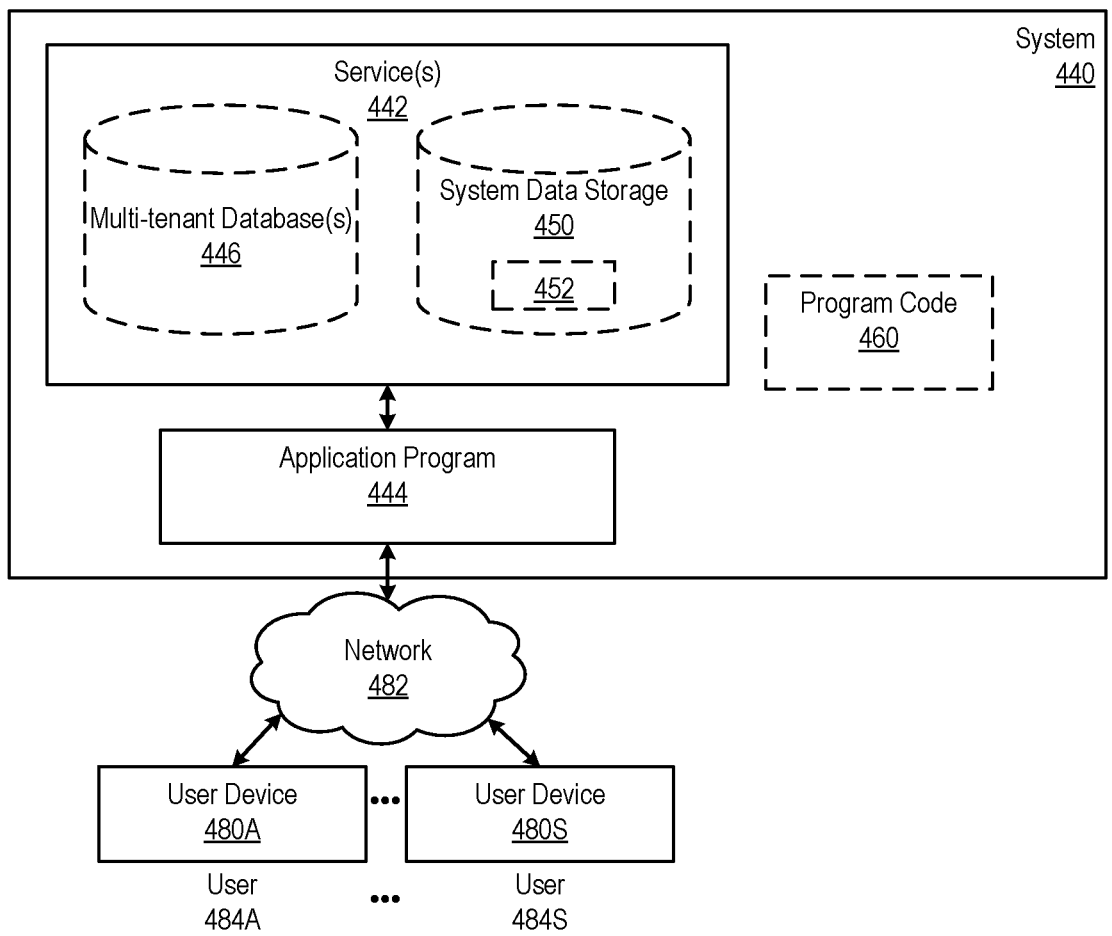
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the service instances (e.g., service 154A). In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM); internal service(s) (e.g., microservice(s)) that implement one or more of the earlier-mentioned types of services.

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the service instances (e.g., service 154A), may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A non-transitory machine-readable storage medium that provides instructions that, if executed by a set of one or more processors in one or more electronic devices, are configurable to cause the performance of operations, comprising:
    processing a plurality of packets at a higher layer of a network stack,
        wherein at least one packet of the plurality of packets was previously determined, as part of processing the at least one packet at lower layers of the network stack, to be authorized to be processed by the higher layer based on a determination that the at least one packet is associated with a handshake process to establish an encrypted connection, wherein the at least one packet is destined for a destination address associated with an instance of a first service, wherein the at least one packet was sent using a source address, wherein packets sent using the source address are otherwise configured to be unauthorized to be processed by the higher layer, and wherein the processing at the higher layer includes:
responsive to successful authentication of a cryptographic certificate received during the handshake process, identifying from the cryptographic certificate a second service, wherein an instance of the second service is associated with the source address; and
determining, based on a security policy that defines the first and second service as being respectively within a first and second segment of a network, that the second service is authorized to access the first service; and
responsive to the determination, causing a configuration such that packets sent using the source address are now authorized to be processed by the higher layer.

2. The non-transitory machine-readable storage medium of claim 1, wherein the lower layers and higher layer of the network stack are implemented on one electronic device within the first segment of the network.

3. The non-transitory machine-readable storage medium of claim 1, wherein the lower layers of the network stack are implemented on a first electronic device within the first segment of the network, wherein a part of the higher layer of the network stack is implemented on a second electronic device within the first segment of the network, and wherein the configuration is implemented on the first electronic device.

4. The non-transitory machine-readable storage medium of claim 1, the operations further comprising:
receiving a subsequent packet sent using the source address; and
responsive to the subsequent packet, authorizing, based on the configuration, the subsequent packet to be processed by the higher layer.

5. The non-transitory machine-readable storage medium of claim 1, wherein the determination that the at least one packet being associated with a handshake process includes determining that the at least one packet is a first packet of the handshake process, and wherein the operations further comprising:
responsive to the determination that the at least one packet is the first packet of the handshake process, storing a data record for the network connection associated with the handshake process; and
responsive to receiving a first subsequent packet sent using the source address, determining that the stored data record exists and, in response, authorizing the first subsequent packet to move further in the lower layers of the network stack.

6. The non-transitory machine-readable storage medium of claim 5, the operations further comprising:
responsive to determining that the handshake process fails, removing the stored data record; and
responsive to receiving a second subsequent packet sent using the source address, determining that there is no data record for an existing network connection associated with the handshake process and, in response, denying the second subsequent packet further movement in the lower layers of the network stack.

7. The non-transitory machine-readable storage medium of claim 1, wherein the handshake process uses mutual authentication.

8. A method for network segmentation, implemented by one or more electronic devices, the method comprising:
processing a plurality of packets at a higher layer of a network stack,
wherein at least one packet of the plurality of packets was previously determined, as part of processing the at least one packet at lower layers of the network stack, to be authorized to be processed by the higher layer based on a determination that the at least one packet is associated with a handshake process to establish an encrypted connection, wherein the at least one packet is destined for a destination address associated with an instance of a first service, wherein the at least one packet was sent using a source address, wherein packets sent using the source address are otherwise configured to be unauthorized to be processed by the higher layer, and
wherein the processing at the higher layer includes:
responsive to successful authentication of a cryptographic certificate received during the handshake process, identifying from the cryptographic certificate a second service, wherein an instance of the second service is associated with the source address; and
determining, based on a security policy that defines the first and second service as being respectively within a first and second segment of a network, that the second service is authorized to access the first service; and
responsive to the determination, causing a configuration such that packets sent using the source address are now authorized to be processed by the higher layer.

9. The method of claim 8, wherein the lower layers and higher layer of the network stack are implemented on one electronic device within the first segment of the network.

10. The method of claim 8, wherein the lower layers of the network stack are implemented on a first electronic device within the first segment of the network, wherein a part of the higher layer of the network stack is implemented on a second electronic device within the first segment of the network, and wherein the configuration is implemented on the first electronic device.

11. The method of claim 8, the method further comprising:
receiving a subsequent packet sent using the source address; and
responsive to the subsequent packet, authorizing, based on the configuration, the subsequent packet to be processed by the higher layer.

12. The method of claim 8, wherein the determination that the at least one packet being associated with a handshake process includes determining that the at least one packet is a first packet of the handshake process, and wherein the method further comprising:
responsive to the determination that the at least one packet is the first packet of the handshake process, storing a data record for the network connection associated with the handshake process; and
responsive to receiving a first subsequent packet sent using the source address, determining that the stored data record exists and, in response, authorizing the first subsequent packet to move further in the lower layers of the network stack.

13. The method of claim 12, the method further comprising:
responsive to determining that the handshake process fails, removing the stored data record; and
responsive to receiving a second subsequent packet sent using the source address, determining that there is no data record for an existing network connection associated with the handshake process and, in response, denying the second subsequent packet further movement in the lower layers of the network stack.

14. The method of claim 8, wherein the handshake process uses mutual authentication.

15. A set of one or more electronic devices configured for network segmentation, the set of electronic devices comprising:
  a set of one or more processors; and
  a set of one or more non-transitory machine-readable storage mediums that provide instructions that, if executed by the set of processors, are configurable to cause the set of electronic devices to perform operations comprising:
    processing a plurality of packets at a higher layer of a network stack,
      wherein at least one packet of the plurality of packets was previously determined, as part of processing the at least one packet at lower layers of the network stack, to be authorized to be processed by the higher layer based on a determination that the at least one packet is associated with a handshake process to establish an encrypted connection, wherein the at least one packet is destined for a destination address associated with an instance of a first service, wherein the at least one packet was sent using a source address, wherein packets sent using the source address are otherwise configured to be unauthorized to be processed by the higher layer, and
      wherein the processing at the higher layer includes:
        responsive to successful authentication of a cryptographic certificate received during the handshake process, identifying from the cryptographic certificate a second service, wherein an instance of the second service is associated with the source address; and
        determining, based on a security policy that defines the first and second service as being respectively within a first and second segment of a network, that the second service is authorized to access the first service; and
        responsive to the determination, causing a configuration such that packets sent using the source address are now authorized to be processed by the higher layer.

16. The set of electronic devices of claim 15, wherein the lower layers and higher layer of the network stack are implemented on one electronic device within the first segment of the network.

17. The set of electronic devices of claim 15, wherein the lower layers of the network stack are implemented on a first electronic device within the first segment of the network, wherein a part of the higher layer of the network stack is implemented on a second electronic device within the first segment of the network, and wherein the configuration is implemented on the first electronic device.

18. The set of electronic devices of claim 15, the operations further comprising:
  receiving a subsequent packet sent using the source address; and
  responsive to the subsequent packet, authorizing, based on the configuration, the subsequent packet to be processed by the higher layer.

19. The set of electronic devices of claim 15, wherein the determination that the at least one packet being associated with a handshake process includes determining that the at least one packet is a first packet of the handshake process, and wherein the operations further comprising:
  responsive to the determination that the at least one packet is the first packet of the handshake process, storing a data record for the network connection associated with the handshake process; and
  responsive to receiving a first subsequent packet sent using the source address, determining that the stored data record exists and, in response, authorizing the first subsequent packet to move further in the lower layers of the network stack.

20. The set of electronic devices of claim 19, the operations further comprising:
  responsive to determining that the handshake process fails, removing the stored data record; and
  responsive to receiving a second subsequent packet sent using the source address, determining that there is no data record for an existing network connection associated with the handshake process and, in response, denying the second subsequent packet further movement in the lower layers of the network stack.

21. The set of electronic devices of claim 15, wherein the handshake process uses mutual authentication.

\* \* \* \* \*